United States Patent [19]
Worsley

[11] Patent Number: 5,237,971
[45] Date of Patent: Aug. 24, 1993

[54] VALVE STEM SEAL ASSEMBLY

[75] Inventor: Clifford R. Worsley, Langenfeld, Fed. Rep. of Germany

[73] Assignee: Goetze AG, Burscheid, Fed. Rep. of Germany

[21] Appl. No.: 900,371

[22] Filed: Jun. 18, 1992

[30] Foreign Application Priority Data

Jun. 18, 1991 [DE] Fed. Rep. of Germany ....... 4119952

[51] Int. Cl.⁵ .............................. F01L 3/08; F16J 15/32
[52] U.S. Cl. .................................................. 123/188.6
[58] Field of Search ....... 123/188.6; 277/152, 277/153, 175, 177, 178

[56] References Cited

U.S. PATENT DOCUMENTS

| | | | |
|---|---|---|---|
| 4,325,558 | 4/1982 | Poggio | 123/188.6 |
| 4,336,945 | 6/1982 | Christiansen et al. | 277/153 |
| 4,508,020 | 4/1985 | Szcupak | 277/153 |
| 4,527,673 | 7/1985 | Szcupak | 277/153 |
| 4,747,605 | 5/1988 | Antonini | 277/153 |
| 4,947,811 | 8/1990 | Binford | 123/188.6 |
| 4,993,379 | 2/1991 | Viazzi | 123/188.6 |
| 5,167,419 | 12/1992 | Robertson | 277/153 |
| 5,174,256 | 12/1992 | Binford | 123/188.6 |
| 5,178,243 | 1/1993 | Hamada et al. | 277/153 |
| 5,186,472 | 2/1993 | Romero et al. | 277/152 |

FOREIGN PATENT DOCUMENTS

| | | |
|---|---|---|
| 1957595 | 3/1967 | Fed. Rep. of Germany . |
| 1966994 | 8/1967 | Fed. Rep. of Germany . |
| 1981067 | 3/1968 | Fed. Rep. of Germany . |
| 3538240 | 1/1987 | Fed. Rep. of Germany . |
| 1398656 | 3/1965 | France . |
| 0096316 | 7/1980 | Japan ............................ 123/188.6 |

OTHER PUBLICATIONS

"Valve Stem Seals Handle Oil Metering and Wear", 372 Automotive Engineering, vol. 90 (Jan.-1982), No. 1, pp. 75-78.
GOETZE Ventilschaftdichtringe, Sep. 1981, 4 pages (cover pages and pp. 8,9).

*Primary Examiner*—Willis R. Wolfe
*Assistant Examiner*—Erick Solis
*Attorney, Agent, or Firm*—Spencer, Frank & Schneider

[57] ABSTRACT

A valve stem seal assembly for installation about a valve stem surrounded by a valve guide includes a sleeve-like elastomer body having the following four components: (1) an annular, outer, oil-sealing lip for sealingly surrounding the valve stem in the installed state of the seal assembly; (2) an annular, inner, gas-sealing lip for sealingly surrounding the valve stem in the installed state of the seal assembly; (3) a diaphragm situated axially between the oil-sealing lip and the gas-sealing lip and being connected to the oil-sealing lip; and (4) a generally cylindrical mounting part for surrounding and engaging the valve guide in the installed state of the seal assembly. The gas-sealing lip is directly connected with the mounting part externally of a region of the diaphragm. The seal assembly further has a rigid housing surrounding and contacting the mounting part; and a pressure-stable zone between the gas-sealing lip and the diaphragm for separating the oil-sealing lip from the gas-sealing lip with respect to vibrations.

5 Claims, 1 Drawing Sheet

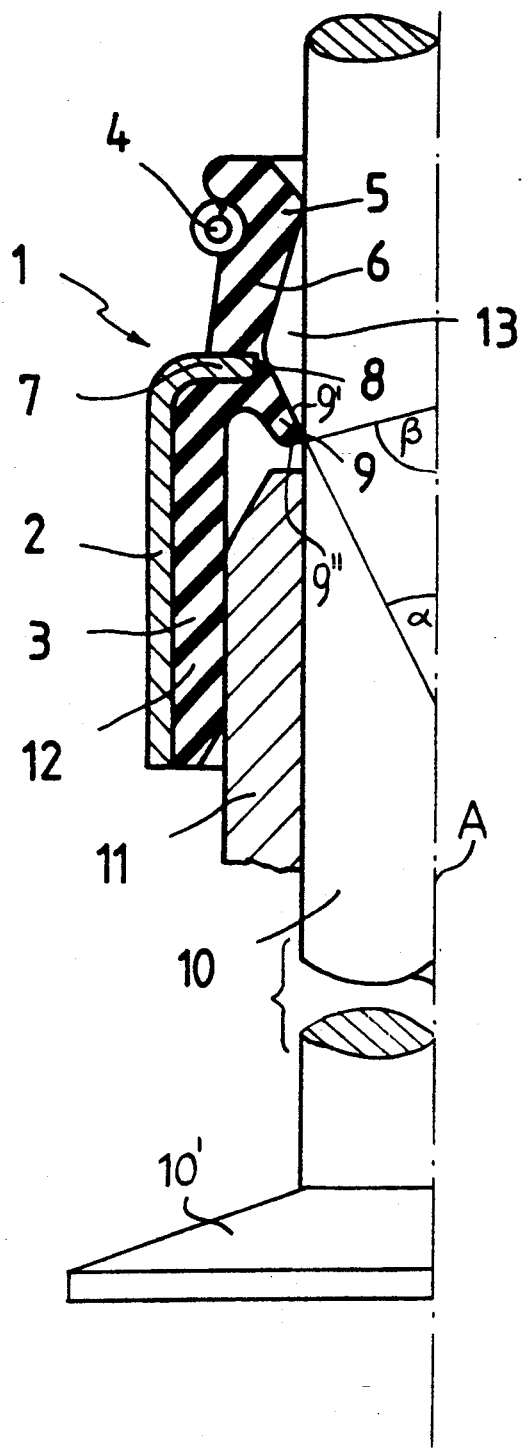

VALVE STEM SEAL ASSEMBLY

CROSS REFERENCE TO RELATED APPLICATION

This application claims the priority of German Application No. P 41 19 952.9 filed Jun. 18, 1991.

BACKGROUND OF THE INVENTION

This invention relates to a valve stem seal assembly for valves of internal combustion engines wherein high pressures prevail in the intake and/or outlet ports. The seal assembly includes a rigid housing in which an elastomer sealing body is arranged that has at least two sealing lips engaging the valve stem and being effective in opposite directions. One of the sealing lips which is closer to the combustion chamber served by the valve functions as a gas-sealing lip, whereas the other sealing lip which is more remote from the combustion chamber functions as an oil-sealing lip. The elastomer sealing body further has an adhering portion insertable on a valve guide sleeve and an elastic diaphragm which permits radial displacements and which is connected with the oil-sealing lip.

German Utility Patent No. 1,966,994 discloses a valve stem seal assembly having two sealing lips engaging the valve stem. The sealing lips are situated immediately axially adjacent and the gas-sealing lip is formed from the oil-sealing lip. Both sealing lips are radially displaceably guided by a highly elastic intermediate component constituted by a diaphragm so that the two sealing lips are interconnected and thus are vibration-dependent from one another.

It has been found that in internal combustion engines where a high pressure exists in the intake and/or outlet ports, for example, in turbo engines, the pressure prevailing in the intake and outlet port may reach such a high value that the sealinq lips lift off the valve stem. Upon a pressure increase on the combustion chamber side the gas pressure may, in the known seal constructions, directly affect the intermediate member (that is, the diaphragm) as a result of which the latter is pushed outwardly or, in case of a vacuum, drawn inwardly. Upon such an occurrence the gas-sealing lip then serves as a fulcrum for a radial displacement of the oil-sealing lip so that the pressing of the oil-sealing lip against the shaft stem is adversely affected, whereby significant fluctuations in the oil dosages may occur.

SUMMARY OF THE INVENTION

It is an object of the invention to provide an improved shaft stem seal assembly of the above-outlined type in which the oil-sealing lip remains in contact with the shaft stem even in case of significant pressure fluctuations.

This object and others to become apparent as the specification progresses, are accomplished by the invention, according to which, briefly stated, the valve stem seal assembly for installation about a valve stem surrounded by a valve guide includes a sleeve-like elastomer body having the following four components: (1) an annular, outer, oil-sealing lip for sealingly surrounding the valve stem in the installed state of the seal assembly; (2) an annular, inner, gas-sealing lip for sealingly surrounding the valve stem in the installed state of the seal assembly; (3) a diaphragm situated axially between the oil-sealing lip and the gas-sealing lip and being connected to the oil-sealing lip; and (4) a generally cylindrical mounting part for surrounding and engaging the valve guide in the installed state of the seal assembly. The gas-sealing lip is directly connected with the mounting part externally of a region of the diaphragm. The seal assembly further has a rigid housing surrounding and contacting the mounting part; and a pressure-stable zone between the gas-sealing lip and the diaphragm for separating the oil-sealing lip from the gas-sealing lip with respect to vibrations.

By virtue of the particular arrangement and the isolation of the gas-sealing lip from the oil-sealing lip as concerns vibrations, upon pressure increase the gas-sealing lip is pressed with a greater force against the valve stem. An effect of the pressure on the oil-sealing lip is prevented because the elastic diaphragm is shielded by the pressure-stable zone.

According to an advantageous feature of the invention, the pressure-stable zone is formed by a radially inwardly extending flange of the housing which penetrates into the elastomer body. As a result, the housing and the flange function as a stiffening member so that the oil-sealing lip is shielded from the gas pressure. To make possible a removal of oil from the space between the oil-sealing lip and the gas-sealing lip, the gas-sealing lip angle that opens toward the oil-sealing lip is smaller than the gas-sealing lip angle that opens in a direction away from the oil-sealing lip. Such a relationship of the angles further provides that the pressure forces the gas-sealing lip strongly onto the valve stem and the gas-sealing lip may not flip over in the space between the oil-sealing lip and the gas-sealing lip. For the purpose of obtaining a permanent gas seal, the inner diameter of the gas-sealing lip is smaller than the diameter of the valve stem so that the gas-sealing lip engages the valve stem with an overlap.

BRIEF DESCRIPTION OF THE DRAWING

The sole Figure is an axial sectional half of a preferred embodiment of the invention.

DESCRIPTION OF THE PREFERRED EMBODIMENT

Turning to the Figure, the valve stem seal assembly generally designated at 1 includes a deformation-resistant (rigid) housing 2, a sleeve-like elastomer sealing body 3 and a spiral spring ring 4. The sealing body 3 has a cylindrical mounting part 12 whose outer cylindrical face is bonded by vulcanization to the inner cylindrical face of the housing 2.

The elastomer body 3 has, in an axial end zone where the spring ring 4 is located, an annular sealing lip 5 which is oriented towards a non-illustrated valve cover lid of the engine. Or, stated differently, the sealing lip 5 is oriented away from the valve head 10', carried at the lower end of the valve stem 10. The valve stem 10 has a central longitudinal axis A which coincides with the axis of the seal assembly I in its installed state. The sealing lip 5 functions as an oil-sealing lip.

Axially adjacent the oil-sealing lip 5 the elastomer body 3 has a diaphragm portion 6 which allows radial displacements of the oil-sealing lip 5. The housing 2 has a radially inwardly bent flange 7 which penetrates into the elastomer body 3 and defines a pressure-stable zone 8 just externally of the diaphragm portion 6.

Adjoining the pressure-stable zone in an axial direction there is provided an annular gas-sealing lip 9 which, similarly to the oil-sealing lip 5, circumferentially engages the valve stem 10. Considering the seal assembly 1 as a whole, the oil-sealing lip 5 can also be viewed as an axially outer lip and the gas-sealing lip 9 may be viewed a an axially inner lip. The gas-sealing lip 9 extends directly from the mounting part 12 which is insertable onto the valve guide 11 and adheres to the outer circumferential surface thereof. By virtue of this construction, the gas-sealing lip 9 shields the diaphragm 6 and the oil-sealing lip 5 from pressure fluctuations. The pressure is compensated by the housing 2 and its flange 7 without allowing the oil-sealing lip 5 to lift off the valve stem 10 or that a change in the geometry of the sealing lip edges occur. A pressure increase causes a greater pressing of the gas-sealing lip 9 onto the valve stem 10.

By vibrationally uncoupling the oil-sealing 5 lip by means of the pressure-stable zone 8, the radial displacements of the gas-sealing lip 9 have no effect on the oil-sealing lip 5. The gas-sealing lip 9 is defined by a wall 9' oriented toward the oil-sealing lip 5 and a wall 9'' oriented away from the oil-sealing lip 5. The angle $\alpha$ which is formed between the wall 9' and the axis A and which opens toward the oil-sealing lip 5 is smaller than the angle $\beta$ which is formed between the wall 9'' and the axis A and which opens in a direction away from the oil-sealing lip 5. By virtue of these angular relationships the oil allowed to pass by the oil-sealing lip 5 to the valve guide 11 is led away from the space 13 between the oil-sealing lip 5 and the gas-sealing lip 9.

It will be understood that the above description of the present invention is susceptible to various modifications, changes and adaptations, and the same are intended to be comprehended within the meaning and range of equivalents of the appended claims.

What is claimed is:

1. A valve stem seal assembly for installation about a valve stem surrounded by a valve guide, the seal assembly having a longitudinal axis and comprising
   (a) a sleeve-like elastomer body having
      (1) an annular, outer, oil-sealing lip for sealingly surrounding the valve stem in the installed state of the seal assembly;
      (2) an annular, inner, gas-sealing lip for sealingly surrounding the valve stem in the installed state of the seal assembly; the gas-sealing lip being axially spaced from said oil-sealing lip;
      (3) a diaphragm situated between said oil-sealing lip and said gas-sealing lip and being connected to said oil-sealing lip; and
      (4) a generally cylindrical mounting part for surrounding and engaging the valve guide in the installed state of the seal assembly; said gas-sealing lip being directly connected with said mounting part externally of a region of said diaphragm;
   (b) a rigid housing surrounding and contacting said mounting part; and
   (c) means defining a pressure-stable zone between said gas-sealing lip and said diaphragm for separating said oil-sealing lip from said gas-sealing lip with respect to vibrations.

2. The valve stem seal assembly as defined in claim 1, wherein said means defining a pressure-stable zone comprises a radially inwardly oriented flange forming part of said housing.

3. The valve stem seal assembly as defined in claim 2, wherein said flange penetrates into said elastomer body between said mounting member and said diaphragm.

4. The valve stem seal assembly as defined in claim 1, wherein said gas-sealing lip has converging first and second walls; said first wall being oriented toward said oil-sealing lip and defining a first angle with said axis; said second wall being oriented away from said oil-sealing lip and defining a second angle with said axis; said first angle being smaller than said second angle.

5. The valve stem seal assembly as defined in claim 1, in combination with said valve stem; said valve stem having an outer diameter and said gas-sealing lip having an inner diameter; said inner diameter being smaller than said outer diameter.

* * * * *